United States Patent
Namboodiri et al.

(10) Patent No.: US 9,525,819 B2
(45) Date of Patent: Dec. 20, 2016

(54) ENHANCING SPATIAL RESOLUTION OF IMAGES FROM LIGHT FIELD IMAGING SYSTEMS USING SUB-PIXEL DISPARITY

(71) Applicants: Vipin Namboodiri, Bangalore (IN); Krishna Prasad Agara Venkatesha Rao, Bangalore (IN)

(72) Inventors: Vipin Namboodiri, Bangalore (IN); Krishna Prasad Agara Venkatesha Rao, Bangalore (IN)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/200,579

(22) Filed: Mar. 7, 2014

(65) Prior Publication Data

US 2015/0256744 A1   Sep. 10, 2015

(51) Int. Cl.
- H04N 5/232 (2006.01)
- H04N 5/265 (2006.01)
- H04N 5/262 (2006.01)
- H04N 13/02 (2006.01)
- G06T 3/40 (2006.01)
- G06T 5/50 (2006.01)

(52) U.S. Cl.
CPC ......... *H04N 5/23232* (2013.01); *G06T 3/4053* (2013.01); *G06T 5/50* (2013.01); *H04N 5/265* (2013.01); *H04N 5/2624* (2013.01); *H04N 13/0232* (2013.01); *G06T 2207/10052* (2013.01)

(58) Field of Classification Search
CPC .. H04N 5/23232; H04N 5/265; H04N 5/2624; H04N 5/23222; H04N 5/23212; H04N 13/0232;G06T 2207/10052; G06T 3/4053; G06T 5/50
See application file for complete search history.

(56) References Cited

U.S. PATENT DOCUMENTS

| | | | | |
|---|---|---|---|---|
| 7,936,392 B2* | 5/2011 | Ng | ...................... | G02B 27/0075 348/349 |
| 2008/0309813 A1* | 12/2008 | Watanabe | .............. | G02B 27/46 348/340 |
| 2009/0190024 A1* | 7/2009 | Hayasaka | ......... | H01L 27/14627 348/360 |
| 2012/0182438 A1* | 7/2012 | Berkner | .................... | G01J 3/36 348/222.1 |
| 2013/0057749 A1* | 3/2013 | Hiasa | ..................... | H04N 5/238 348/340 |
| 2013/0070060 A1* | 3/2013 | Chatterjee | ............ | H04N 5/2258 348/47 |

(Continued)

FOREIGN PATENT DOCUMENTS

EP   2403233 A1   1/2012

OTHER PUBLICATIONS

Cho, D. et al., "Modeling the Calibration Pipeline of the Lytro Camera for High Quality Light-Field Image Reconstruction," Korea Advanced Institute of Science and Technology (KAIST), ICCV2013, IEEE, 2013, pp. 3280-3287.

(Continued)

*Primary Examiner* — Luong T Nguyen
(74) *Attorney, Agent, or Firm* — Fenwick & West LLP

(57) ABSTRACT

A light field imaging system captures different images provide views that are shifted by sub-pixel amounts relative to one another. These views can be combined to produce a higher resolution digital image of the object.

20 Claims, 6 Drawing Sheets

(56) References Cited

U.S. PATENT DOCUMENTS

2014/0198230 A1* 7/2014 Tsutsumi .......... H04N 5/23293
348/218.1

OTHER PUBLICATIONS

Georgiev, T. et al, "Superresolution with Plenoptic Camera 2.0," Adobe Technical Report, Apr. 2009, pp. 1-9.
Ng, M.K. et al., "Mathematical Analysis of Super-Resolution Methodology," IEEE Signal Processing Magazine, 2003, pp. 62-74, vol. 20, No. 3.
Bishop, T.E. et al., "Light Field Superresolution," Department of Engineering and Physical Sciences Heriot-Watt University, Edinburgh, UK, 2009 IEEE, pp. 1-9.
Pérez Nava, F. et al., "Simultaneous Estimation of Super-Resolved Depth andAll-In-Focus Images from a Plenoptic Camera," 3DTV Conference, 2009, 4 pages.

* cited by examiner

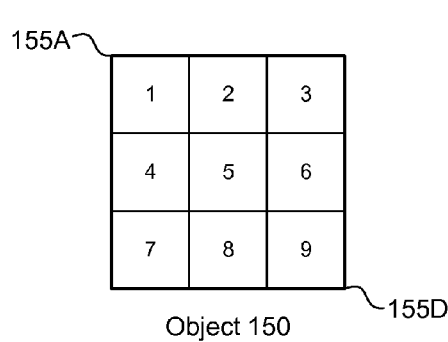
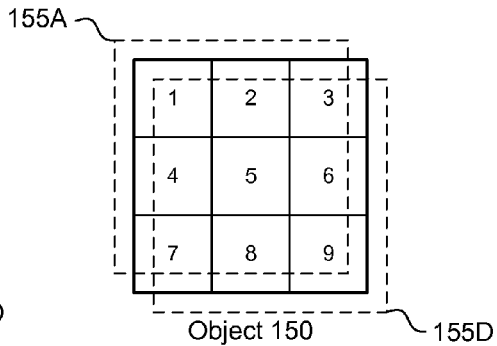
FIG. 3A
FIG. 3B
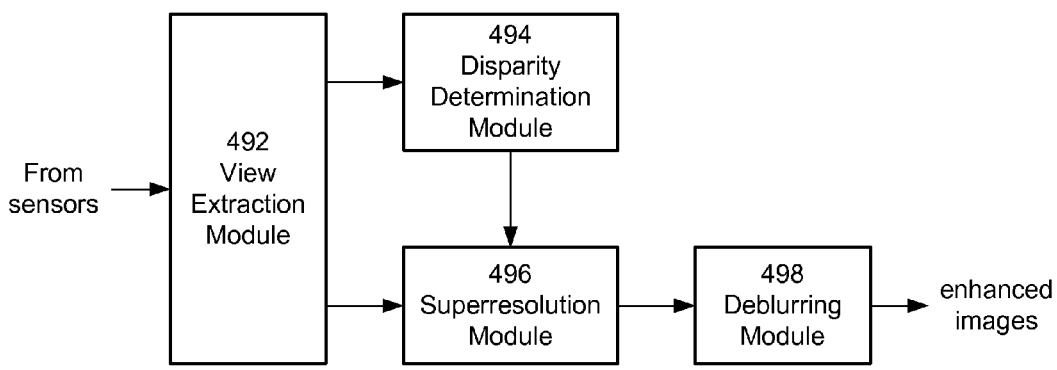
FIG. 4
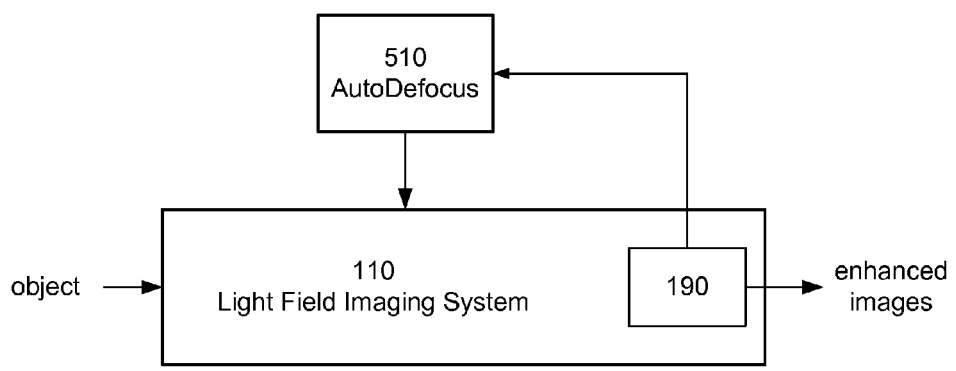
FIG. 5

| AA | AB | AC | AD | AE | AF | AG | AH | AI | AJ | AK | AL | AM | AN | AO | AP |
|----|----|----|----|----|----|----|----|----|----|----|----|----|----|----|----|
| BA |    |    |    |    |    |    |    |    |    |    |    |    |    |    |    |

⋮

| PA |  |  |  |  |  |  |  |  |  |  |  |  |  |  | PP |

FIG. 6A

| AA | AB | AC | AD | AE | AF | AG | AH | AI | AJ | AK | AL | AM | AN | AO | AP |
|----|----|----|----|----|----|----|----|----|----|----|----|----|----|----|----|

↑ 0/8, 1/8, 2/8, 3/8, 4/8, 5/8, 6/8, 7/8 (top)
↑ 0/8, 1/8, 2/8, 3/8, 4/8, 5/8, 6/8, 7/8

| AA | AB | AC | AD | AE | AF | AG | AH | AI | AJ | AK | AL | AM | AN | AO | AP |
|----|----|----|----|----|----|----|----|----|----|----|----|----|----|----|----|
| BA | BB | BC | BD | BE | BF | BG | BH | BI | BJ | BK | BL | BM | BN | BO | BP |

ENHANCING SPATIAL RESOLUTION OF IMAGES FROM LIGHT FIELD IMAGING SYSTEMS USING SUB-PIXEL DISPARITY

BACKGROUND OF THE INVENTION

1. Field of the Invention

This invention relates generally to light field imaging systems.

2. Description of the Related Art

A light field camera can simultaneously collect multiples images of an object. However, the resolution of a light field imaging system is reduced due to the fact that the resolution of the captured images is typically determined by the number of lenslets in the microlens array, rather than by the number of sensors in the sensor array. Thus, there is a need for approaches to increase the resolution of images captured by a light field imaging system.

SUMMARY

The present invention overcomes the limitations of the prior art by providing a light field imaging system in which different images provide views that are shifted by sub-pixel amounts relative to one another. These views can be combined to produce a higher resolution digital image of the object.

In one aspect, a light field imaging system includes a primary optical subsystem, a light field sensor module and a processing module. The primary optical subsystem forms an optical image of an object, at an image plane of the primary optical subsystem. The light field sensor module includes a secondary imaging array and a sensor array. The secondary imaging array images a pupil of the primary optical subsystem onto the sensor array, so that the sensor array captures an array of views of the object. The secondary imaging array is not located at the image plane. Rather, it is displaced from the image plane (i.e., defocused), so that the captured views exhibit sub-pixel disparity. The processing module combines the views into a digital image of the object having a resolution higher than a resolution of the views.

For example, the views could exhibit a view-to-view disparity of 1/N pixels and these views could be combined into a digital image having N× resolution compared to a resolution of the views, where N is an integer greater than 1. The sensor array captures many views. Different groups of views can be used to produce various digital images, and the views can be grouped in different ways. Views can be used in more than one group.

In another aspect, the processing module includes a view extraction module, a disparity determination module, and a superresolution module. The view extraction module receives data from the sensor array and extracts views from the data. The disparity determination module determines a disparity of the views. The superresolution module applies superresolution to the views to produce the higher resolution digital image.

In another aspect, the spacing of the light field sensor module relative to the primary optical subsystem can be adjusted to achieve different disparities (and hence different higher resolution digital images). In another enhancement, an auto defocus module automatically adjusts the spacing (i.e., the amount of defocus) to achieve a desired disparity. The auto defocus module might receive feedback from the processing module to achieve the desired disparity.

Other aspects include devices, methods, systems, components, applications, improvements and other technology related to any of the above.

BRIEF DESCRIPTION OF THE DRAWINGS

The invention has other advantages and features which will be more readily apparent from the following detailed description of the invention and the appended claims, when taken in conjunction with the accompanying drawings, in which:

FIGS. 3A-3B are diagrams illustrating disparity in a light field imaging system.

FIG. 4 is a block diagram of a processing module.

FIG. 5 is a block diagram of a light field imaging system with auto defocus.

FIGS. 6A-6E are diagrams illustrating different approaches to using disparity for resolution enhancement.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
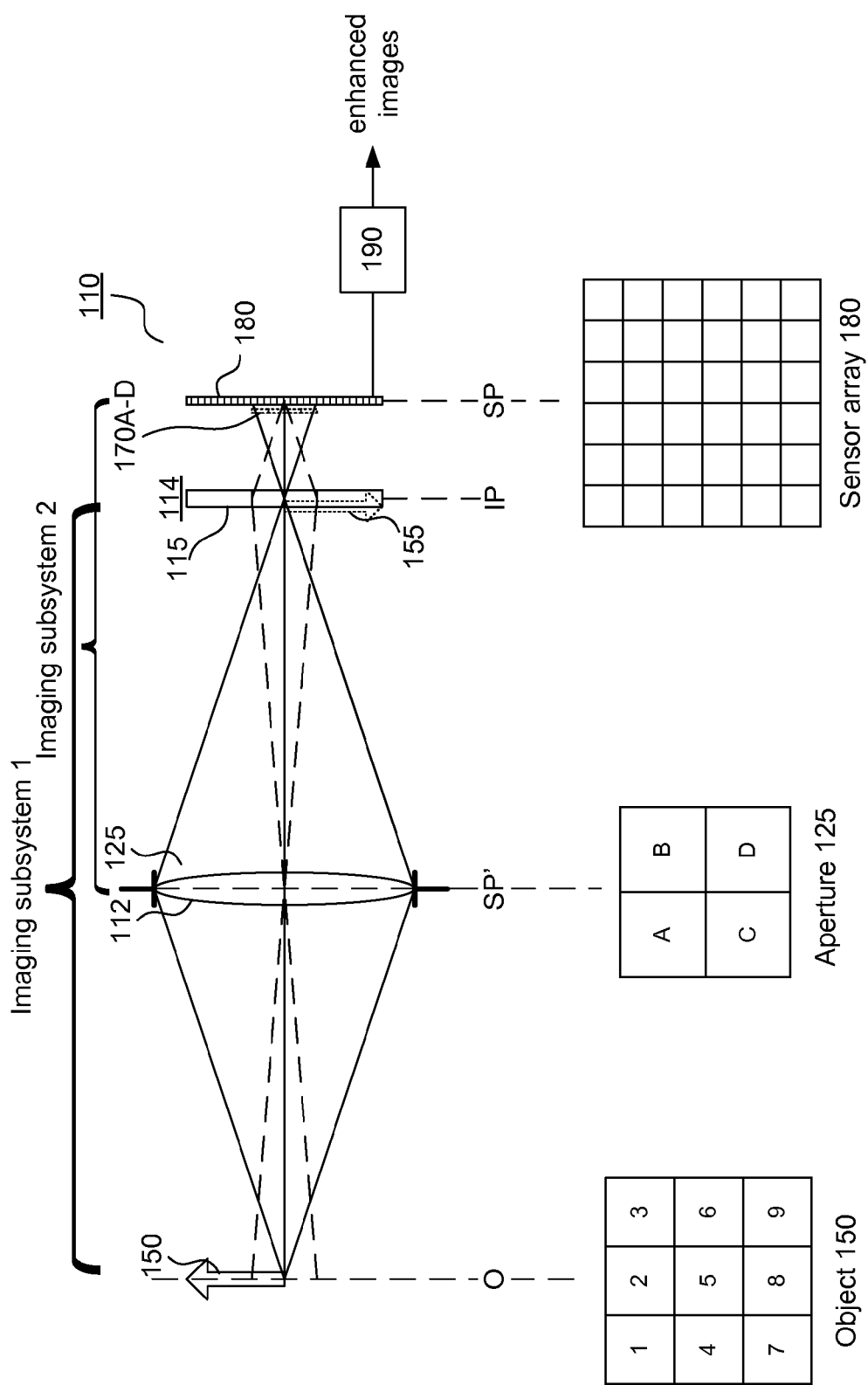
FIGS. 1A-1B are diagrams illustrating a light field imaging system.
Figure 1B:
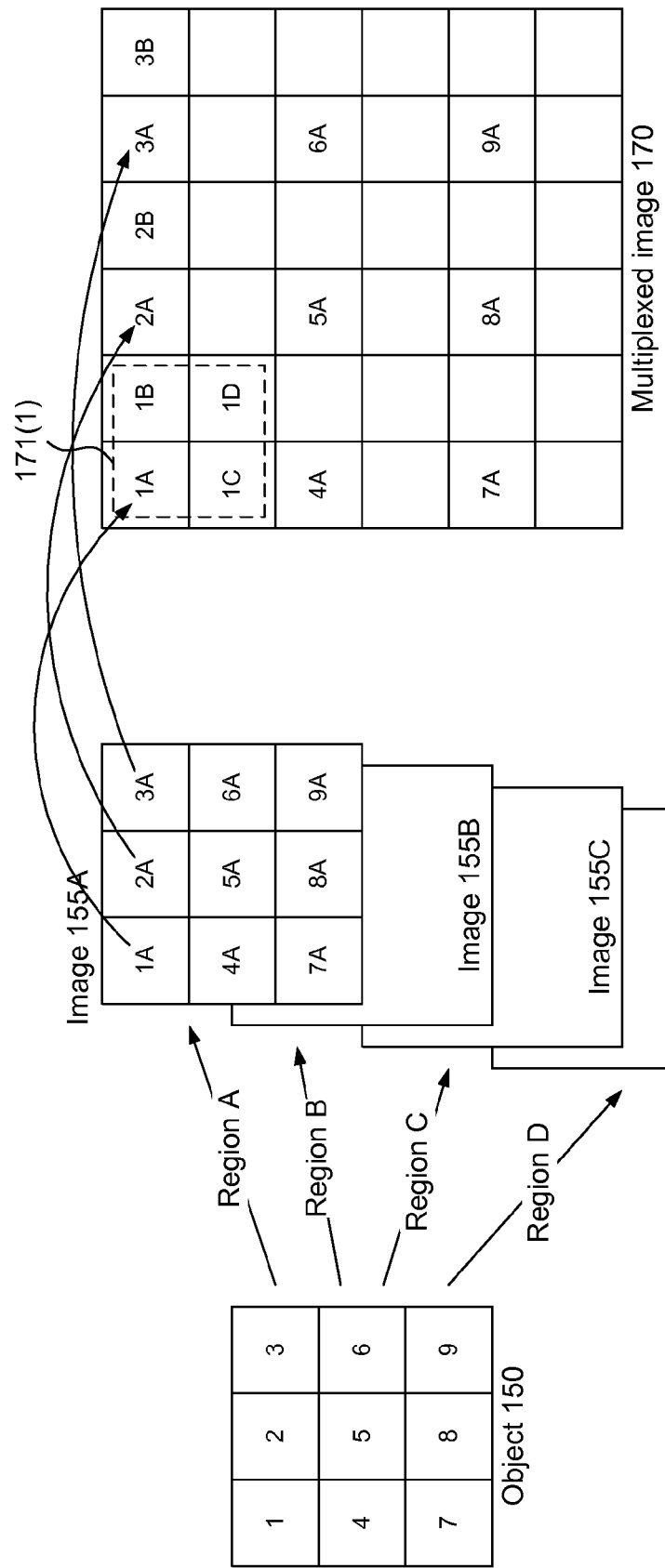

FIGS. 1A-1B are diagrams illustrating an example of a light field imaging system. The light field imaging system 110 includes primary imaging optics 112 (represented by a single lens in FIG. 1A), a secondary imaging array 114 (an array of image forming elements 115) and a sensor array 180. The secondary imaging array 114 may be referred to as a microimaging array. The secondary imaging array 114 and sensor array 180 together may be referred to as a light field sensor module. These components form two overlapping imaging subsystems, shown as subsystem 1 and subsystem 2 in FIG. 1A.

For convenience, the imaging optics 112 is depicted in FIG. 1A as a single objective lens, but it should be understood that it could contain multiple elements. In FIG. 1A, the objective lens 112 forms an optical image 155 of the object 150 at an image plane IP. When operated at the "in focus" condition, the microimaging array 114 is located at the image plane IP. The system in its entirety forms spatially multiplexed and interleaved optical images 170 at the sensor plane SP. Examples of microimaging arrays 114 include microlens arrays, arrays of pinholes, micromirror arrays, checkerboard grids and waveguide/channel arrays. The microimaging array 114 can be a rectangular array, hexagonal array or other types of arrays. The sensor array 180 is also shown in FIG. 1A.

For purposes of illustration, assume that the microimaging array 114 in FIG. 1A is a 3×3 array of microlenses on a square grid. The object 150 is divided into a 3×3 array of regions, which are labeled 1-9 as shown in the lower portion of FIG. 1A. These regions correspond to the microlenses. That is, object region 1 is imaged by objective lens 112 onto one of the microlenses, object region 2 is imaged onto another microlens, etc. The sensor array 180 is shown as a 6×6 rectangular array of sensors. That is, there is a 2×2 arrangement of sensors under each microlens. The aperture 125 is divided into a 2×2 rectangular array of regions A-D. These regions correspond to the 2×2 sensor arrangements. That is, aperture region A is imaged by each microlens onto the corresponding sensor of the 2×2 sensors for that microlens, as are aperture regions B,C,D. In some systems, the aperture regions A-D may be filtered by a different spectral filter, for example.

FIG. 1B illustrates conceptually how the spatially multiplexed optical images 170A-D are produced and interleaved at sensor array 180. The object 150 produces rays. The rays that propagate through aperture region A would produce an optical image 155A at the IP. To identify the optical image 155A, the 3×3 object regions are labeled with the suffix A: 1A-9A. Similarly, the rays from the object 150 that propagate through aperture regions B,C,D, would produce corresponding optical images 155B,C,D with 3×3 object regions labeled 1B-9B, 1C-9C and 1D-9D. Each of these four optical images 155A-D is produced by rays travelling through different aperture regions A-D but they are all produced simultaneously by the light field imaging system 110 and they are overlapping at the IP.

The four optical images 155A-D, which are overlapping at the IP, are separated by the microimaging array 114. The images 155A-D are interleaved at the sensor plane, as shown in FIG. 1B. Using image 155A as an example, the 3×3 object regions 1A-9A from optical image 155A are not contiguous in a 3×3 block within optical image 170. Rather, regions 1A, 1B, 1C and 1D, from the four different optical images, are arranged in a 2×2 fashion in the upper left of optical image 170 (the inversion of image 170 is neglected for clarity). Object regions 2-9 are similarly arranged. Thus, the regions 1A-9A that make up optical image 170A are spread out across the composite optical image 170, separated by portions of the other optical images 170B-D. Put in another way, if the sensor is a rectangular array of individual sensor elements, the overall array can be divided into rectangular subarrays 171(1)-(9) of sensor elements (the dashed outline shows one subarray 171(1)). For each object region 1-9, all of the corresponding regions from each image are imaged onto the subarray. For example, object regions 1A, 1B, 1C and 1D are all imaged onto subarray 171(1). Note that since the aperture 125 and sensor array 180 are located in conjugate planes, each imaging element 115 in array 114 forms an image of the pupil plane 125 at the sensor plane SP. Since there are multiple imaging elements 115, multiple images 171 are formed.

Further note that, in the system shown in FIGS. 1A-1B, the optical images 155A-D are registered with each other. That is, optical image 155A capture the same object region as optical images 155B,C,D. This is because the object is "in focus," meaning that the image plane for the object is coincident with the location of the microimaging array 114. Now consider what happens when the object is "out of focus," as illustrated in FIGS. 2A-2B.

Figure 2A:
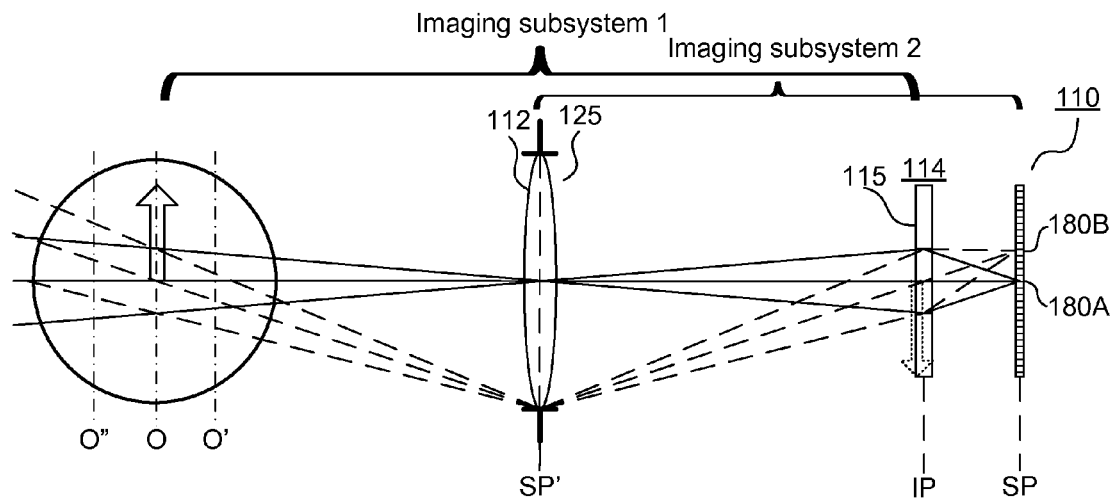
FIG. 2A is a diagram illustrating disparity in a light field imaging system.
Figure 2B:
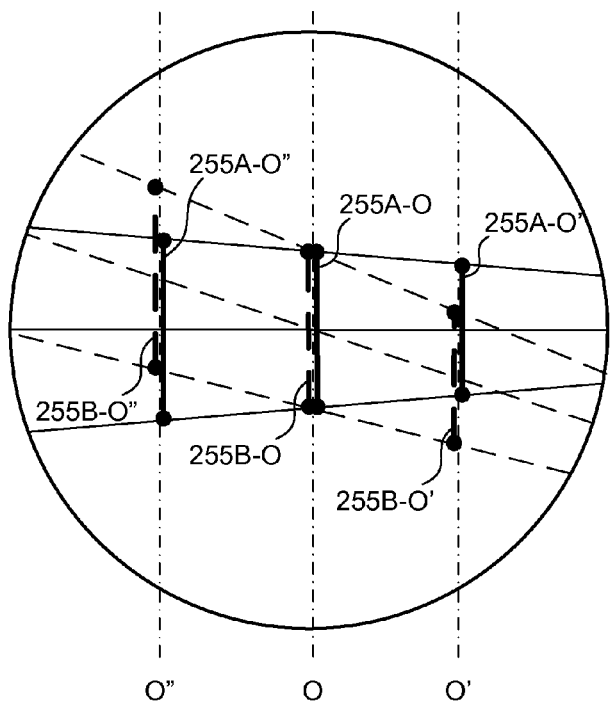
FIG. 2B is a magnification of the object area of FIG. 2A.

In FIG. 2A, consider two points in the sensor plane: 180A and 180B. Point 180A is on-axis located under the middle microlens, and point 180B is shifted away from the center point 180A but still under the same middle microlens. First trace rays backwards from point 180A. These rays are shown by the solid lines. Also trace rays backwards from point 180B. These rays are shown by the dashed lines. These rays represent the cone of rays that will be collected by the respective sensor point 180. Rays that fall within the solid cone will be collected by sensor point 180A, and rays that fall within the dashed cone will be collected by sensor point 180B. Where these rays intersect the object represents the object region collected by the respective sensor point 180.

For example, first consider the solid rays for point 180A. FIG. 2B shows a magnified view of the object region of FIG. 2A. If the object is located at plane O (i.e., the "in focus" condition), then the sensor point 180A will collect rays from object region 255A-O, as denoted by the heavy solid line in FIG. 2B. If the object is "out of focus," that means the image is no longer formed exactly at plane IP or, equivalently, that the object is no longer located exactly at plane O. Rather, the object may be located before or after plane O, for example at planes O' or O". If the object is located at plane O' (i.e., "out of focus"), then the sensor point 180A will collect rays from object region 255A-O'. Similarly, if the object is located at plane O" (i.e., also "out of focus"), then the sensor point 180A will collect rays from object region 255A-O".

A similar analysis can be made for sensor point 180B. The dashed rays define the cone of rays collected by sensor point 180B. If the object is located at "in focus" plane O, then the sensor point 180B will collect rays from object region 255B-O, as denoted by the heavy dashed line in FIG. 2B. For an object at plane O' or O", the sensor point 180B will collect rays from object region 255B-O' or 255B-O", respectively. This type of analysis can be repeated for any of the points on the sensor plane under the same microlens, and it can also be repeated for the other microlenses.

Note that when the object is in focus, object regions 255A-O and 255B-O are coincident. That is, each sensor point 180 collects light from the same object region. However, when the object is out of focus, different sensor points collect light from object regions that are shifted relative to each other. At object plane O', sensor 180A collects light from object region 255A-O', sensor 180B collects light from object region 255B-O', and the two object regions 255A-O' and 255B-O' are not coincident. Rather, they are shifted with respect to each other. This shift is also referred to as disparity. Similarly, for object plane O", the two object regions 255A-O" and 255B-O" are also shifted with respect to each other, but the disparity is in the other direction.

If the multiplexed image 170 includes shifted images of the same object, then the multiplexed image 170 can be processed by processing module 190 to reconstruct a higher resolution digital image of the object. The processing could be deinterleaving and demultiplexing. It could also include more sophisticated image processing, including various superresolution techniques.

The concept of disparity is shown further in FIGS. 3A-3B. FIG. 3A shows the situation when the object is "in focus." The nine squares labeled 1-9 represent the object of FIG. 1. In FIG. 3A, images 155A and 155D are represented as dashed squares. However, these dashed squares are not visible because they are coincident with the heavy outer border of the object 150.

In FIG. 3B, the object 150 is "out of focus." That is, the object forms an image that is not coincident with the location of the microimaging array 114. One effect of this defocusing is that images 155A and 155D shift with respect to each other. For clarity, images 155B and 155C are not shown. In FIG. 3B, images 155A and 155D are shifted with respect to each other. The four images 155A-D then form a set of images that are shifted a half pixel in each of x and y directions. These four images can then be combined using superresolution techniques to form a higher resolution image.

More generally, different sub-pixel shifts can be used to construct various types of higher resolution images. For example, if the image-to-image shift is ¼ pixel, then a 4× higher resolution image can be constructed. The sub-pixel shift effectively adds higher resolution information to the collected data. This can be used to reconstruct higher resolution images. Note that the "pixel" size is determined by the microlens size, not the sensor pixel size. That is, in the typical light field arrangement, one "pixel" is the size of one microlens (which typically is many sensors).

FIG. 4 is a block diagram of one implementation of processing module 190. In this example, the multiplexed and interleaved images 155 are received by a view extraction module 492, which separates the sensor data into separate images 155 (or views). As described above, these views are shifted relative to each other. That is, they exhibit disparity. Preferably, the disparity from one view to the next is less than one pixel. That is, the view-to-view disparity is sub-pixel. Module 494 determines the disparity. For example, it may do this by comparing different views 155. Alternately, module 494 may obtain the disparity from other sources, for example user input. Module 496 then applies superresolution techniques to combine the multiple views with sub-pixel disparity into an image with higher resolution than the original views. Optional additional processing, such as deblurring 498, may also be applied.

FIG. 5 is a block diagram illustrating active control of a light field imaging system to achieve a desired level of resolution enhancement. In FIG. 5, box 110 represents the light field imaging system, for example from FIG. 1A. Only the processing module 190 is explicitly shown. In this example, a certain level of resolution enhancement is desired. For example, maybe the user desires a 4× resolution enhancement. The Auto Defocus 510 determines the correct amount of defocus to achieve the sub-pixel disparity corresponding to the desired level of resolution enhancement. For example, for 4× resolution enhancement, the Auto Defocus 510 may move the objective lens (or otherwise adjust the focus condition) to obtain ¼ pixel disparity.

Optionally, feedback from the processing module 190 may be used to control the Auto Defocus 510. If the actual disparity determined by the processing module 190 is more or less than ¼ pixel, then the Auto Defocus 510 further drives the light field imaging system until the desired disparity is achieved.

The example of FIG. 1A used a 3×3 array of microlenses with a 2×2 array of sensors under each microlens. This was done for purposes of illustration. Real-world light field imaging systems typically will have many more microimaging elements and sensor elements. For example, a typical design might have a microlens array with 200-300 microlenses per side (for a total of 50-100,000 microlenses), and a sensor array under each microlens with 10-20 sensors per side (for a total of 100-500 sensors per microlens). Typical sensor dimensions may be approximately 5 microns per side.

For the following examples, assume a 5 μm×5 μm sensor element, 16×16 sensors under each microlens where each microlens is 80 μm×80 μm, and a 200×200 microlens array with total size of 16 mm×16 mm. The pixel size in this example is the microlens size: 80 μm×80 μm, which is the native resolution of this light field system.

FIG. 6A is a diagram of a 16×16 sensor region under one microlens. This region contains 16×16=256 sensors, each of which corresponds to a different image or view. In FIG. 1B, these images were denoted by the suffix A-D. FIG. 6A uses two-letter suffixes: AA to PP. If the object is in focus, then there will be no disparity between views. That is, views AA to PP will all be aligned. However, if the primary imaging system is out of focus, then disparity can be introduced.

If the view-to-view disparity is 1/16 pixel (i.e., the disparity from view AA to view AB is 1/16 pixel), then the 256 views can be combined to produce a single image with 16× higher resolution. This is illustrated in FIG. 6B, which maps the different views to their corresponding disparity amounts. Image AA is the baseline for measuring disparity, image AB provides the view with 1/16 pixel disparity relative to image AA, image AC provides the view with 2/16 pixel disparity relative to image AA, etc.

For clarity, FIG. 6B shows resolution enhancement only along one direction, although these techniques can be applied to both horizontal and vertical directions. Furthermore, the amount of resolution enhancement and/or the final resolution could be different in the horizontal and vertical directions. For example, in the case of machine vision applications, increase in resolution in one dimension might be more important than in the other dimension. Another situation where non square sampling could be used is in the case of geometric design of multispectral filters where the filter can be rectangular to accommodate higher horizontal or vertical resolutions.

Furthermore, this example addresses resolution enhancement for an object located on a two-dimensional plane. For a three-dimensional object, the disparity varies with depth (as determined by block 494 of FIG. 4), and different regions of the image would have different disparity levels. For example, consider a smooth three-dimensional object. The view-to-view disparity at one depth might be 0.25 pixels. As the object z-location moves closer to the focal point, the disparity might decrease to 0.24 pixels and then to 0.22 pixels, etc. As the object z-location moves away from the focal point, the disparity could increase to 0.27 pixels to even 0.33 pixels. A scene with objects at various depths might have disparity variations of 0.25 and 0.10 pixels in neighboring regions. In these cases, module 494 may determine the depth profile in order to determine the local disparity. Block 494 may optionally also resolve occlusion and reveal.

Alternately, in FIG. 6C, every other view is used to produce an image with 8× higher resolution. The view-to-view disparity across all views is 1/16 pixel. However, views AA, AC, AE, etc. form a group of views that are used to produce an 8× resolution digital image. The view-to-view disparity within this group is ⅛ pixel, as shown in FIG. 6C which uses view AA as the baseline for the group. The group is formed by selecting every Nth view (N=2 here). However, this only uses ¼ of the total sensors. The remaining sensors can be used to produce 3 additional groups, each of which can also produce digital images with 8× resolution. There is one group AB, AD, AF, etc. In FIG. 6C, disparity for that group is shown relative to view AB. Similarly, there are two other groups starting with image BA and BB, respectively. If desired, different filters can be placed in the aperture plane 125, so that a total of four images are produced, each with 8× resolution and filtered differently. Four filters might be red, green, blue and clear, for example. FIG. 6C shows the first two rows of 16 sensors split into four 8× resolution images.

Figure 6D:
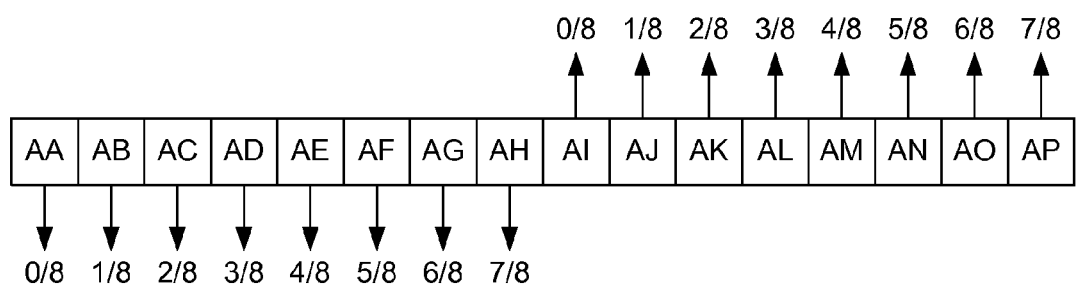

Images of different resolution can also be produced. For example, the 16× resolution image of FIG. 6B and the 8× resolution images of FIG. 6C can both be produced. View AA can be included in the group of FIG. 6B to produce the 16× resolution image, and it can also be included in the group of FIG. 6C to produce the 8× resolution image. A similar result can be achieved by using a view-to-view disparity of ⅛ pixel, as shown in FIG. 6D. In this example, views AA-AH are one group used to produce one 8× resolution image (disparity shown relative to view AA), and views AI-AP are a second group used to produce the other 8× resolution image (disparity shown relative to view AI). A third and fourth group of views would also be available from sensors not shown in FIG. 6D. Again, each image may be filtered differently, although this filtering pattern is easier to produce because the filters are less finely interleaved compared to FIG. 6C. One difference between FIGS. 6C and 6D is that, in FIG. 6D, the views in one group are all contiguous, whereas they are interleaved in FIG. 6C. Another difference is that the total disparity in one dimension across all views is greater than one pixel in FIG. 6D, but less than one pixel in FIG. 6C.

Figure 6E:
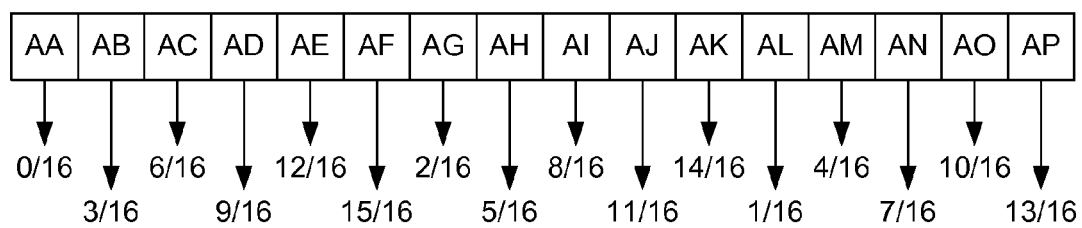

In FIG. 6E, the view-to-view disparity is 3/16 pixel. This can also be used to produce a 16× resolution image, although with some reordering of pixels. These are just some examples. Other combinations will be apparent. In addition, the view-to-view disparity does not have to exactly match the desired degree of superresolution. For example, if the view-to-view disparity was ⅙ pixel, and a 4× resolution enhancement is desired, the views could be interpolated or otherwise combined to yield the 4× enhancement. Similarly, if the microlenses were placed on a hexagonal grid, values on a rectangular grid could be interpolated from the hexagonal grid.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, the aspects of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules. Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components.

What is claimed is:

1. A light field imaging system for producing an image of an object, the light field imaging system comprising:
  a primary optical subsystem that forms an optical image of an object, the optical image located at an image plane of the primary optical subsystem;
  a light field sensor module comprising a secondary imaging array and a sensor array, the secondary imaging array imaging a pupil of the primary optical subsystem onto the sensor array, the secondary imaging array displaced from the image plane so that the sensor array simultaneously captures an array of views of the object;
  an auto defocus module that adjusts a spacing of the light field sensor module relative to the primary optical subsystem, wherein different spacings result in different disparities for the array of views; and
  a processing module coupled to receive the array of views; wherein the auto defocus module receives feedback from the processing module and uses the feedback to adjust the spacing of the light field sensor module relative to the primary optical subsystem to achieve a view-to-view disparity of M/N pixels, wherein M and N are relatively prime integers and N/M is greater than 1; and the processing module combines the array of views into a digital image of the object having a resolution that is approximately L times higher than a resolution of any one of the views where L is an integer factor of N and L is 2 or greater.

2. The light field imaging system of claim 1 wherein L=2.

3. The light field imaging system of claim 1 wherein L=4.

4. The light field imaging system of claim 1 wherein a total disparity in one dimension across the array of views is less than one pixel.

5. The light field imaging system of claim 1 wherein a total disparity in one dimension across the array of views is greater than one pixel.

6. The light field imaging system of claim 1 wherein M=1 and a total disparity in one dimension across the array of views is (N−1)/N pixels.

7. The light field imaging system of claim 1 wherein the views in the array of views are contiguous views.

8. The light field imaging system of claim 1 wherein the views in the array of views are interleaved views.

9. The light field imaging system of claim 1 wherein the views in the array of views are non-adjacent views.

10. The light field imaging system of claim 1 wherein the processing module combines K arrays of views into K higher resolution digital images, where K is an integer greater than 1.

11. The light field imaging system of claim 10 wherein each view is included in only one of the K arrays of views.

12. The light field imaging system of claim 10 wherein at least one view is included in more than one of the arrays of views.

13. The light field imaging system of claim 10 wherein the K higher resolution digital images includes digital images of different resolutions.

14. The light field imaging system of claim 1 wherein the processing module comprises:
   a view extraction module that receives data from the sensor array and extracts the array of views from the data;
   a disparity determination module that determines a disparity of the array of views; and
   a superresolution module that applies superresolution to the array of views to produce the higher resolution digital image.

15. The light field imaging system of claim 1 wherein the processing module applies superresolution to the array of views to produce the higher resolution digital image.

16. The light field imaging system of claim 1 wherein the spacing of the light field sensor module relative to the primary optical subsystem is further adjustable to achieve zero disparity.

17. The light field imaging system of claim 1 wherein L=N, so that the processing module combines the array of views into a digital image of the object having a resolution that is approximately N times higher than a resolution of any one of the views.

18. The light field imaging system of claim 1 wherein M is 2 or greater.

19. The light field imaging system of claim 1 wherein M is odd.

20. The light field imaging system of claim 1 wherein N is a power of 2.

* * * * *